United States Patent [19]

Armstrong

[11] 4,020,239
[45] Apr. 26, 1977

[54] CATHODE FOR HYDRAZINE/AIR CELL

[75] Inventor: William A. Armstrong, Ottawa, Canada

[73] Assignee: Her Majesty the Queen in right of Canada as represented by the Minister of National Defence, Ottawa, Canada

[22] Filed: Jan. 23, 1976

[21] Appl. No.: 651,741

[30] Foreign Application Priority Data

July 17, 1975 Canada .................... 231707

[52] U.S. Cl. .................................. 429/42
[51] Int. Cl.² ............................... H01M 4/00
[58] Field of Search ........... 136/86 D, 86 A, 86 R, 136/86 E; 429/40, 41, 42

[56] References Cited

UNITED STATES PATENTS

| | | | |
|---|---|---|---|
| 3,116,170 | 12/1963 | Williams | 136/86 D |
| 3,276,909 | 10/1966 | Moos | 136/86 D |
| 3,925,100 | 12/1975 | Buzzelli | 136/86 A |

Primary Examiner—John H. Mack
Assistant Examiner—H. A. Feeley
Attorney, Agent, or Firm—Lorne C. Shaw; W. John McClenahan; H. Wayne Rock

[57] ABSTRACT

A cathode for use in a hydrazine/air fuel cell which comprises a sintered nickel substrate having a silver electrocatalyst deposited thereon and having, on one side, a semipermeable hydrophobic membrane, and on the other side thereof a hydrophilic microporous separator membrane. The silver-sintered nickel substrate may be wet-proofed by dipping in a solution of PTFE and in order to lower polarization of the cathode the silver-sintered nickel substrate may be amalgamated by treatment with a mercuric salt.

11 Claims, 2 Drawing Figures

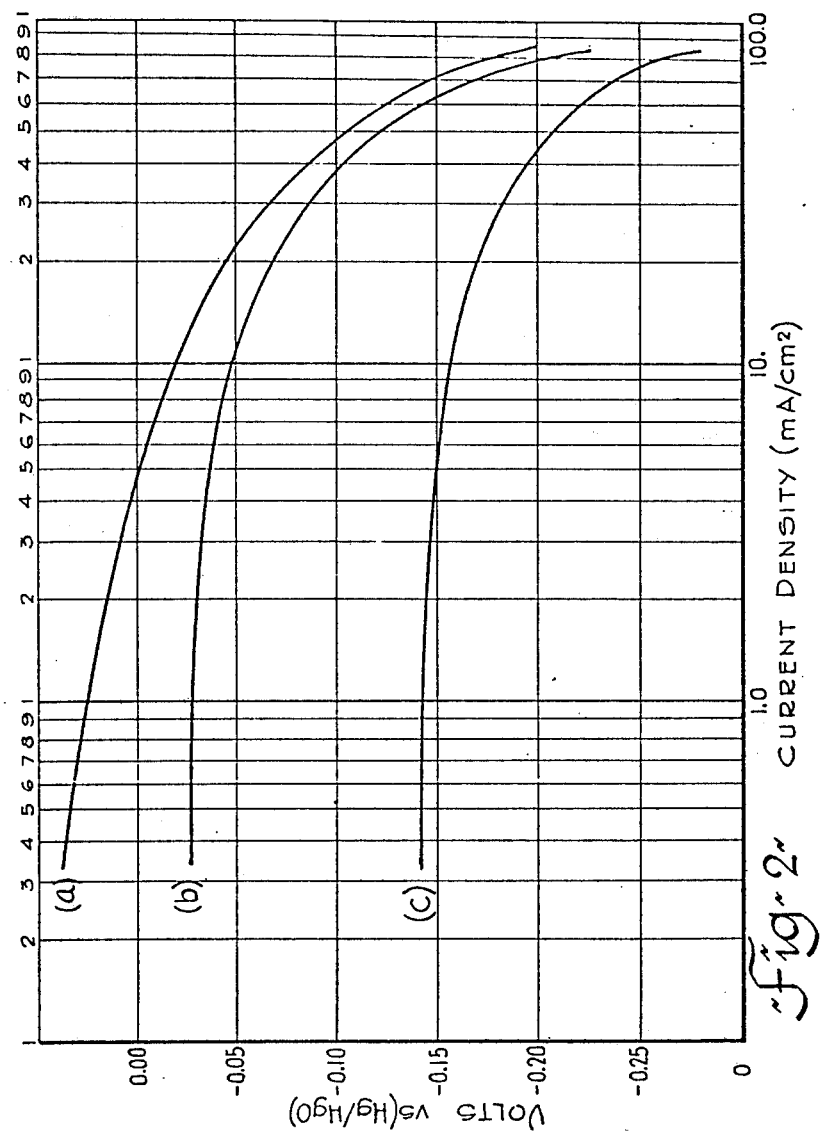
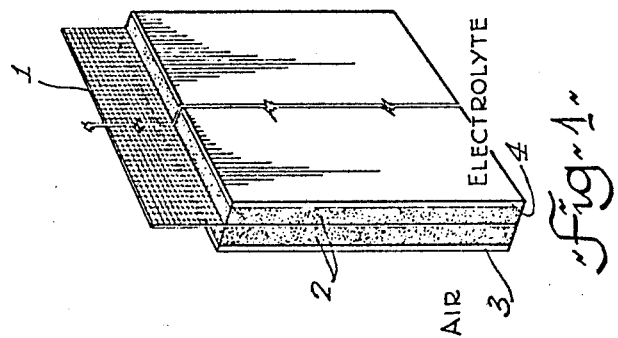

CATHODE FOR HYDRAZINE/AIR CELL

This invention relates to electrodes for fuel cells and more particularly to a novel oxygen cathode for use in a hydrazine/air fuel cell.

In hydrazine/air fuel cells, carbon based cathodes have conventionally been employed. However, the gaseous decomposition products of hydrazine tend to physically damage the cathode structure and this can lead to excessive weeping of electrolyte from the air cathode structure. In an effort to counteract this phenomenon carbon-based cathodes have been prepared wherein large concentrations of polytetrafluoroethylene (PTFE) have been added to the cathode mix during preparation thereof in order to "wetproof" the final cathode. This is not, however, desirable as large amounts of PTFE increase the polarization of the cathode and thus reduce the cell voltage. As the hydrazine fuel itself also increases polarization the deleterious effect on cell voltage is compounded. Another expedient is to provide a separator material between the anode and cathode, however, some hydrazine always diffuses through the separator and decomposes on the cathode. The resulting gas may force electrolyte through the cathode or may build up between the cathode and separator and thus create an open circuit within the cell.

It is an object of the present invention to provide an improved cathode for use in a hydrazine/air fuel cell which overcomes, at least in part, the deficiencies of the prior art cathodes.

Thus, by one aspect of the present invention there is provided a cathode for use in a hydrazine/air fuel cell comprising an electrically conductive substrate having an electrocatalyst deposited thereon, a semipermeable hydrophobic membrane applied to one side of said electrocatalyst deposited substrate, and a hydrophilic microporous separator membrane applied to the other side of said electrocatalyst deposited substrate.

The invention will be described in more detail hereinunder with reference to the accompanying drawings in which:

FIG. 1 is a schematic section through a cathode of the present invention; and

FIG. 2 is a graph showing electrode potential v current density for coated cathodes of the present invention and uncoated cathodes in different electrolytes.

As shown in FIG. 1, the cathode of the present invention is provided with a sintered nickel substrate plaque 2, of the type commonly used in the nickel-cadmium battery industry. Generally the substrate is of the order of 0.071 cm thick and has a porosity of the order of 85%, and is provided with a nickel screen current collector 1. It has been found that this substrate is stronger and more durable than the carbon, or more accurately graphite, substrate of the prior art. In addition it has been found that nickel does not decompose hydrazine, as does carbon or graphite, and less gas is generated during fuel cell operation.

An electrocatalyst, generally silver, is deposited on the nickel substrate, in a manner which is known per se, to provide a loading in the range of about 2 to about 25 mg/cm$^2$ of substrate surface. In order to lower cathode polarization, the silver-sintered nickel structure is preferably amalgamated by immersion thereof in an aqueous solution of a mercuric salt so as to provide about 1–3% by weight of mercury in the structure.

It is also desirable that the silver-sintered nickel substrate structure should be wet-proofed and this may be achieved by dipping in a solution containing PTFE so as to provide a PTFE loading of the order of 1.5–3 mg/cm$^2$. Wet-proofing substantially eliminates flooding of the catalyst and leakage of electrolyte through the cathode.

A semi-permeable hydrophobic membrane 3 is then applied to the air side of the cathode to allow access of oxygen to the reactive sites while preventing the leaking or weeping of electrolyte. Preferably the hydrophobic membrane is a commercially available microporous PTFE or polypropylene film.

A microporous polypropylene separator membrane 4, made hydrophilic by treatment with a surfactant, is applied to the electrolyte side of the cathode and becomes an integral part of the cathode structure. Hydrazine flows through this material at a slower rate than does potassium hydroxide electrolyte. The concentration of hydrazine at the active sites within the cathode is, therefore, reduced to an acceptable level. As the membrane 4 is pressed directly on the cathode substrate 2, there is no build-up of gas between the cathode and the separator.

EXAMPLE I

A 3.18 × 3.18 cm square of clean dry sintered nickel plaque with a 1.27 × 1.27 cm tab extending from one corner was dipped in a solution containing 30 mg/ml of silver nitrate. The plaque was drained, dried over a hot plate and left in an oven at 125° C for 0.5 hr. The plaque was then plunged into a 6.9M solution of potassium hydroxide, drained, dried over a hot plate and left in an oven at 125° C for 0.5 hr. It was then washed with distilled water for 0.2 hr and dried. Next, the plaque was immersed in a freshly prepared solution containing 60 mg/ml of mercuric acetate, drained, dried in an oven at 125° C for 0.25 hr, washed with distilled water for 0.2 hr, drained and dried. The cathode was then wet-proofed by dipping in a solution containing 54.4 mg/ml of PTFE prepared by mixing 0.5 ml Teflon-30 and 7.5 ml of distilled water. It was drained, dried over a hot plate, left in an oven at 125° C for 0.5 hour and then placed on a hot plate at 250° C for 0.05 hour. The resulting structure contained 12 mg/cm$^2$ silver, 2.5 mg/cm$^2$ PTFE and 1.4% by weight mercury. The air side of the cathode was covered with a piece of Zitex E606–223 PTFE membrane which was pressed onto the cathode at 125° C and 112 kg/cm$^2$. The electrolyte side of the electrode was then covered with a piece of Celgard 2400W microporous polypropylene which was pressed on at 100° C and 112 kg/cm$^2$.

EXAMPLE II

A cathode was prepared as described in Example I except for the application of the membranes. Instead of first applying the PTFE film and then the hydrophilic polypropylene, hydrophobic Celgard 2400 and hydrophilic Celgard 2400W were pressed simultaneously on the air and electrolyte sides respectively at 100° C and 112 kg/cm$^2$. The Celgard 2400 and 2400W are both microporous polypropylene membranes but the 2400W contains a wetting agent.

EXAMPLE III

A piece of sintered nickel having the same dimensions as described in Example I was dipped into a solution containing 30 mg/ml of silver nitrate. The plaque was drained, dried over a hot plate and left in an oven at 125° C for 0.25 hour. The plaque was next immersed briefly in a 6M potassium hydroxide-5M hydrazine solution, dried over a hot plate and left in an oven a 125° C for 0.5 hour. It was then washed and dried in an oven at 125° C for 0.25 hour. The treatment with mercuric acetate, wet-proofing with PTFE and application of membranes were performed as described in Example I.

EXAMPLE IV

A piece of sintered nickel having the same dimensions as described in Example I was dipped into a solution containing 30 mg/ml of silver nitrate. The plaque was drained, dried over a hot plate and left in an oven at 125° C for 0.5 hour. The plaque was then suspended in a vacuum desiccator over a petrie dish containing 20 M hydrazine solution. The desiccator was evacuated and left standing for 1.5 hour. The plaque was removed, dipped in 6.9M KOH, washed with distilled water for 10 minutes and dried for 0.25 hour in an oven at 125° C. The treatment with mercuric acetate, wetproofing with PTFE and application of membranes were carried out exactly as described in Example I.

Examples III and IV differ from I and II in the method used to convert the silver nitrate to either silver oxide or silver. The treatment with 6.9M potassium hydroxide employed in I and II converts the silver nitrate to silver oxide which is reduced to silver when the electrode is used in a fuel cell. In Examples III and IV, hydrazine in either alkaline solution or as the vapour is used to reduce the silver compound directly to silver.

Other mercury salts, for example mercuric nitrate, may be used in the amalgamation process but mercuric acetate is the preferred compound.

Attention is now directed to FIG. 2 in which curves (a) and (b) show that cathodes prepared as described in Example I hereinabove, and thus have a separator as part of the cathode structure, are only slightly affected by the presence of hydrazine in the electrolyte. Curve (a) is a plot of electrode potential v current density in an electrolyte comprising 6M KOH and curve (b) is a plot of electrode potential v current density in an electrolyte comprising 6M KOH and 1M $N_2H_4$. Curve (c), which shows a plot of electrode potential $v$ current density in an electrolyte comprising 6M KOH and 1M $N_2H_4$ for a cathode made according to Example I but without a hydrophilic separator 4, demonstrates that a bare cathode operates at a considerably lower potential in a hydrazine-potassium hydroxide solution than does a cathode provided with a Celgard 2400 W separator.

That the improved cathode retains its desirable properties during prolonged operation was demonstrated by driving a cell consisting of a cathode prepared as described in Example I, a nickel screen counter electrode and an electrolyte-fuel mixture consisting of 6M KOH and 1M $N_2H_4$ (which was changed daily) at a current density corresponding to 50 mA/cm$^2$ on the cathode. The observed decrease in cathode potential of 50 during 2000 hours of operation represents only a very slight deterioration in performance.

I claim:
1. A cathode for use in a hydrazine/air fuel cell comprising an electrically conductive substrate having an electrocatalyst deposited thereon, a semipermeable hydrophobic membrane applied to one side of said electrocatalyst-deposited substrate, and a hydrophilic microporous separator membrane applied to the other side of said electrocatalyst-deposited substrate, said electrocatalyst-deposited substrate being wetproofed with from 1.5 to 3 mg/cm$^2$ of polytetrafluoroethylene.
2. A cathode as claimed in claim 1, wherein said electrocatalyst is silver in an amount of 2–25 mg/cm$^2$.
3. A cathode as claimed in claim 2 wherein said electrocatalyst-deposited substrate is amalgamated.
4. A cathode as claimed in claim 3 wherein said electrocatalyst-deposited substrate contains 1–3% by weight of mercury.
5. A cathode as claimed in claim 1, wherein said substrate is a sintered nickel plaque.
6. A cathode as claimed in claim 1, wherein said hydrophobic membrane is selected from the group comprising microporous polytetrafluoroethylene and polypropylene film.
7. A cathode as claimed in claim 1, wherein said hydrophilic separator membrane is surfactant-treated polypropylene.
8. A cathode as claimed in claim 4, wherein said substrate is a sintered nickel plaque and said electrocatalyst is silver in an amount of 2–25 mg/cm$^2$.
9. A cathode as claimed in claim 8 wherein said hydrophobic membrane is selected from the group comprising microporous polytetrafluoroethylene and polypropylene film, and said hydrophilic separator membrane is surfactant-treated polypropylene.
10. A cathode for use in a hydrazine/air fuel cell comprising a sintered nickel substrate provided with a nickel screen current collector and said substrate having silver deposited thereon as catalyst in an amount of 2–25 mg/cm$^2$, said catalyst-deposited substrate being wet-proofed with from 1.5 to 3 mg/cm$^2$ of polytetrafluoroethylene, a semipermeable hydrophobic membrane selected from the group comprising microporous polytetrafluorethylene and polypropylene films applied to one side of said catalyst-deposited substrate, and a hydrophilic microporous separator membrane comprising surfactant-treated polypropylene applied to the other side of said catalyst-deposited substrate.
11. A cathode for use in a hydrazine/air fuel cell comprising a sintered nickel substrate provided with a nickel screen current collector and said substrate having silver deposited thereon as catalyst in an amount of 2–25 mg/cm$^2$, said catalyst-deposited substrate being amalgamated with from 1–3% by weight of mercury and being wet-proofed with from 1.5 to 3 mg/cm$^2$ of polytetrafluoroethylene, a semipermeable hydrophobic membrane selected from the group comprising microporous polytetrafluorethylene and polypropylene films applied to one side of said catalystdeposited substrate; and a hydrophilic microporous separator membrane comprising surfactant-treated polypropylene applied to the other side of said catalyst-deposited substrate.

* * * * *